United States Patent [19]

Carlin

[11] Patent Number: 5,397,815

[45] Date of Patent: Mar. 14, 1995

[54] PROCESS FOR THE PRODUCTION IN WATERY EMULSION OF BLENDS OF POLYVINYLIC ALCOHOLS AND RESPECTIVE PRODUCTS OBTAINED

[76] Inventor: Francesco Carlin, Via Magnolia 45010 Isola Di Albarella 10a Est, Rosolina (RO), Italy

[21] Appl. No.: 778,230

[22] PCT Filed: May 17, 1990

[86] PCT No.: PCT/IT90/00052

§ 371 Date: Dec. 13, 1991

§ 102(e) Date: Dec. 13, 1991

[87] PCT Pub. No.: WO90/15827

PCT Pub. Date: Dec. 27, 1990

[30] Foreign Application Priority Data

Jun. 15, 1989 [IT] Italy .................................. 83427/89

[51] Int. Cl.⁶ .............................................. C08K 5/00
[52] U.S. Cl. .................................... 523/332; 524/503; 524/803
[58] Field of Search ................. 524/503, 803; 523/332

[56] References Cited

U.S. PATENT DOCUMENTS

| | | | |
|---|---|---|---|
| 3,049,520 | 8/1962 | Gatta et al. | 524/803 X |
| 4,189,415 | 2/1980 | Eck et al. | 524/503 X |
| 4,200,708 | 4/1980 | McClain | 525/62 |
| 4,324,878 | 4/1982 | Biaggi et al. | 526/200 |
| 4,401,790 | 8/1983 | ter Jung et al. | 525/62 |
| 4,528,315 | 7/1985 | Eck et al. | 524/503 X |
| 4,923,922 | 5/1990 | Carlin | 525/62 |

*Primary Examiner*—Judy M. Reddick
*Attorney, Agent, or Firm*—Edmund M. Jaskiewicz

[57] ABSTRACT

Process for the preparation of an aqueous emulsion of two or more polyvinyl alcohols (PVA) for the production of polyvinylchloride (PVC-S) in an aqueous suspension in which at least a first polyvinylacetate (PVAc) with molecular weight between 30 and 110K is utilized and, with technique of alcoholisis acid or basic, to carry out the trans-esterification of the PVAc until a saponification number between 598 and 135 is attained.

4 Claims, No Drawings

PROCESS FOR THE PRODUCTION IN WATERY EMULSION OF BLENDS OF POLYVINYLIC ALCOHOLS AND RESPECTIVE PRODUCTS OBTAINED

The object of this invention is the process for the production of an aqueous emulsion of polyvinyl alcohols (PVA) with different saponification number. This invention, more particularly, refers to the method of preparation of polyvinyl alcohol (PVA) intended to be utilized in polymerization for the industrial production of polyvinylchloride in aqueous suspension (PVC-S).

In the description of the following invention, the following parameters of evaluation and numeration of the characteristics of the products utilized and obtained are adopted:

saponification number (NS) that represents the milligrams of potassium hydroxide necessary for saponifying 1 g of the sample. For example, operating in the following order: 1 g. of sample is weighed, then the product is dissolved in 50 mL (cc) of water and 50 mL (cc) of methyl alcohol; 1 mL (cc) of alcoholic solution of phenolphthalein is added; 100 mL (cc) of solution of KOH N/10 are added and the product is reflux heated for 1 hour. The product is titrated with HCl N/10 and after that stoichiometric calculations of the milligrams of KOH utilized for saponifying the product are made.

Molecular weight of the polyvinylacetate (PVAc) expressed in K value of a PVAc that is determined by means of measuring the relative viscosity of a solution in acetone of the PVAc. The value of relative viscosity, by means of the table that reports the previously determined values, is transformed into K value. The method is the following: One gram of perfectly desiccated sample is weighed, then it is dissolved in 100 mL (cc) of acetone and with Ostwald Viscosimeter series 50, at 25° C., the precipitation time of the solution is measured. The ratio of the precipitation times of the solution and of the pure acetone, furnishes the value of relative viscosity. It is known that for producing PVC-S with optimum morphological characteristics, in the formulations of polymerization of the vinyl chloride monomer (VCM), in aqueous suspension, a system of suspending agents based on polyvinyl alcohols with distinct characteristics of solubility and insolubility in water is utilized.

The PVAs with saponification number below 280 are soluble in water and are commonly called "primary suspending agents".

The PVAs with saponification number greater than 280 are partly insoluble in water and are empirically called "secondary suspending agents". In the production of the PVC-S, it is of great importance to utilize secondary suspending agents type PVA which are free from residues of methyl alcohol, methyl-acetate, ethyl alcohol, ethyl-acetate and preparations under the form of aqueous emulsion with microparticles of diameter less than 10 $\mu$m, with NS greater than 280, preferably around 480.

Thanks to a perfect distribution, from the first instants of polymerization, of the microparticles of the secondary suspending agent in the reacting mass, the main characteristic of the PVC-S, namely distribution of the internal porosity in the granules of PVC-S, the apparent density, the quantity of granules totally or partly gelled commonly called "fish-eyes", the granulometric distribution, the thermic stability, the resistivity of volume, are notably improved.

EP-0123364 (STAMICARBON) discloses a method of production of the PVC-S that uses as suspending system an aqueous dispersion of polyvinyl alcohols; but this patent does not describe the technology of preparation of this aqueous dispersion.

In the patent IT-83315-A-86, a technology of hydrolysis of microparticles of PVAc, previously produced in aqueous emulsion, is claimed. The method indicated utilizes an aqueous solution of sodium hydroxide as basic catalyst of hydrolysis and the simultaneous removal of the salts, resulting from the hydrolysis, by means of the process of ultrafiltration.

But this method allows only the utilization of the technology of the direct saponification of the PVAc; the consequence is the production of PVAc without alternate distribution of the hydroxyl groups called in literature "RANDOM", obtainable only by acidic alcoholysis in the presence of methyl alcohol or ethyl alcohol.

Furthermore during the process of ultrafiltration, used for eliminating a great quantity of sodium acetate produced from the process of basic hydrolysis, through the membranes are discharged waters containing fractions of polyvinyl alcohol of low molecular weight, soluble in water and verifiable by measuring the viscosity of their solution of 4% in water at a temperature of 20° C., with Viscosimeter Hoeppler, with values of viscosity between 0.5 and 3.5 mPa.s (centipoises). This leakage of polyvinyl alcohol into the waste waters, negatively affects the costs of production and of biological treatment of the waste waters themselves.

The main scope of the invention is to bring a perceptible improvement to the technique of preparation of an aqueous emulsion of polyvinyl alcohols of different saponification number obtained by both acidic alcoholysis and by basic alcoholysis and to supply a cheap and reproducible technology for preparation of the same.

In agreement with what is claimed in the present invention, this scope is reached by means of a method for the preparation of a blend of PVA in aqueous emulsion for use in the polymerization of the PVC-S, characterized by:

i) utilizing at least a first PVAc (polyvinylacetate) with molecular weight between 30 and 110K, preferably 50 and, with acidic or basic catalyst in the presence of ethyl alcohol or methyl alcohol, to carry out the alcoholysis of the PVAc up to values of saponification number between 598 and 135, preferably between 598 and 312, optimally 511;

ii) loading from 0.1 to 5 times, preferably 0.7 times, parts by weight of at least a second PVAc having molecular weight between 10 and 90K, preferably 10 and 50, optimally 25;

iii) stopping the alcoholysis in order that, in the final alcoholic solution, the respective polyvinyl alcohols result perfectly mixed in order to obtain:

a) at least a first polyvinyl alcohol, with saponification number between 280 and 95, preferably 230 and soluble in water;

b) at least a second polyvinyl alcohol, with saponification number between 598 and 312, preferably 480, insoluble in water;

distilling during alcoholysis, or at its termination, the residual solvents by adding water after the termination of the alcoholysis, with the scope of obtaining the coagulation in water of the second PVA in the form of microparticles with granulometric distribution between 0.01 μm and 10 μm, that are obtained in aqueous emulsion with the first.

This method furnishes a new technique of preparation of aqueous emulsion of PVA of different NS (saponification numbers) based on a new process of simultaneous alcoholysis of two or more PVAc. The method permits further the maintenance of the fundamental applicable characteristics of the primary suspending agent and of the secondary suspending agent of the PVAs constituting the emulsion.

The result is the production of a new product that can be utilized in the initial load of the polymerization in aqueous suspension of the vinyl chloride monomer with advantageous effects on the morphological characteristic of the finished PVC-S. This is confirmed by the detailed research done by the inventor that has studied and applied the product object of the present invention with different technologies of polymerization of the PVC-S, having compared it with the known primary and secondary suspending agents used for producing the PVC-S thus obtaining the following surprising discoveries:

the product is obtainable both with the technique of basic alcoholysis (BLOCKY) and acidic alcoholysis (RANDOM), or with different combinations of the same;

the product has the double function of primary suspending agent and secondary suspending agent and can produce all the types of known PVC-S and at a high qualitative level;

the product has a powerful action of anti-expansion or anti-foaming of the mass in polymerization and allows the achievement of very short reaction times without harmful clogging of the upper portions of the autoclave and of the reflux condenser; if one loads a great quantity of the product in formulation with the objective of improving the thermic stability of the finished PVC-S, we do not observe dangerous increases of the viscosity of the mass in polymerization and the thermal exchange of the autoclave is notably improved.

The product is perfectly compatible and miscible with the aqueous solutions of all the primary suspending agents employed for producing the PVC-S and, together with them, it can be utilized with different combinations of formulation for improving both the qualitative characteristic of the PVC-S and the technology of production of the PVC-S itself;

the product is perfectly stable within intervals of temperature between +60° C. and −30° C.

The freezing and the unfreezing of the product do not cause cracking of the emulsion with consequent precipitation of the fraction insoluble in water;

the product permits the production of stable aqueous emulsions, even at temperatures below 0° C., of the peroxide catalysts of the solid or liquid type employed for the production of the PVC-S;

if we load the product directly into the hot water of polymerization loading lines of the autoclave at a temperature of 65°–70° C., sticky deposits are not observed in the pipelines and the quality the of the PVC-S does not suffer from the technique of loading the autoclave at a high initial temperature.

The advantages that are obtained in the production of the PVC-S are the following:

minimum presence of residual salts and complete absence of residues of methyl alcohol or ethyl alcohol and thus production of PVC-S suitable for sophisticated applications with high characteristics of volume resistivity;

it is possible to control all the characteristic of the PVC-S, as for example: internal porosity, apparent density, granulometric distribution, thermic stability etc., by means of different combinations of the type and of the grade of alcoholysis of the PVA constituting the emulsion itself.

The process is further characterized in that said catalyst is sulphuric acid, and/or sodium methylate, and/or sodium hydroxide, respectively in the proportion parts by weight respective to the PVAc present, between 0.05 and 8 for each of said elements and independently one from the other.

Advantageously the alcohol utilized in the alcoholiysis is methyl or ethyl alcohol in the proportion in parts by weight respective to the PVAc present, between 0.2 and 20 times, preferably 3 times.

Thanks to the use of stable emulsions containing primary and secondary suspending agents and peroxide catalysts, utilized for producing the PVC-S, the technology of automatic loading of the polymerization reactor is notably simplified and definitively perfected in the technique of loading with the manhole closed, in fact the emulsions are easily pumpable in the loading lines of the autoclave and do not generate dangerous deposits in the same.

In the plants of PVC-S, with the use of the product object of the present invention, is revealed a consistent improvement of the productive capacity, accompanied by a significant improvement of the work environment and of the ecological environment where the plants themselves are found. These advantages can be summarised in:

technology of loading the autoclave with manhole closed;
diminution of emission of gaseous VCM caused by the frequent openings of the manhole;
reduction of the quantity of air in the recovered VCM with consequent leakage into the atmosphere of undesired quantities of gaseous VCM universally identified as a powerful carcinogen;
security in the handling and stocking of the catalysts.

EXAMPLES OF PREPARATION OF THE AQUEOUS EMULSION OF POLYVINYL ALCOHOLS WITH DIFFERENT SAPONIFICATION NUMBERS AS CLAIMED WITH THE PRESENT INVENTION.

For the execution of the following described tests, a reactor of the capacity of 580 liters with a vitrified internal surface, with anchor-shaped agitator (revs10–100), and cooling jacket has been utilized. On the upper part, via a 3″ gate, was linked a vitrified reflux condenser with exchange surface of about 1 m², endowed with three-way valves to allow the continuous extraction of the condensate. The emulsions of PVA have been analyzed using the following methods of analysis:

Determination of % of the active substance.

The % of active substance is determined by the simple method of evaporation of 5 g. of sample put in an aluminium capsule for 3 hours at 110° C. in a ventilated stove.

Viscosity in centipoises of the aqueous solutions of PVA at 20° C.:

An aqueous solution containing 4% of active substances of the sample to be analyzed is prepared, and at 20° C., with Viscosimeter Hoeppler, the precipitation time is measured.

By means of a calibration table, furnished by the constructor of the Viscosimeter, it is possible to arrive at the value of viscosity of the solution.

Determination of the type of alcoholysis—BLOCKY—RANDOM:

The type of distribution of the hydroxyl groups OH, in the PVA chain, has been determined by means of use of the apparatus NMR (Nuclear Magnetic Resonance Spectroscope).

Diameter of partly hydrolyzed microparticles PVAc:

The determination of the granulometric distribution of the microparticles of the PVAc insoluble in water has been effected with the apparatus commonly called COLTER-COUNTER.

Example No. 1

Into the reactor are loaded: 250 Kg. of an aqueous solution containing 13 Kg. of polyvinyl-alcohol with NS equal to 137 and with viscosity of the solution, of 4% in water of 45 mPa.s (cps.) 25 Kg. of Vinyl-Acetate-Monomer (VAM) 0.03 Kg. of ammonium persulphate. The product is polymerized at a temperature of 63° C. for 5400 s (90 minutes). For further 3 hours, further 125 Kg. of VAM are fed in. When the loading is completed, the temperature is increased to 95° C. over a time lapse of 2 hours, for completing (99.6%) the conversion of the VAM to polyvinylacetate PVAc in aqueous emulsion. Its molecular weight or K value at analysis is 102. The emulsion is discharged and in the reactor 120 Kg. of the product are left; at a temperature of 40° C. in 20 minutes is added in the order of 250 Kg. of methyl alcohol and 2.5 Kg. of concentrated H2S04 ((d.)g/mL 1.83). Finally the mass is brought to the reflux temperature and after that the process of acidic alcoholysis continues for 9 hours. In 600 s (10 minutes) a methanolic solution containing the 50% of polyvinylacetate ( PVAc ) with K value equal to 25 is added (this product can be obtained both with techniques of polymerization in solution and in block). Always by reflux, the distilled material constituted by the azeotrope methylic methyl-aceticalcohol that is formed during the alcoholisis, is removed, the operation requires further 9 hours with a total removal of 170 Kg. of solvents.

The alcoholysis is stopped with 2 Kg. of NaOH dissolved in 20 Kg. of H20. The methyl alcohol residue is stripped substituting it gradually with an equal amount of water. The product is diluted with water to a final percent of solids of 23%.

During the final strippage the fraction of PVA, equal to the 30% with respect to the total of polyvinyl alcohols, having NS equal to 480, precipitates in the form of microparticles with diameter between 0.01 pm and 10 μm emulsified in the aqueous means containing a great quantity of polyvinyl alcohol with NS equal to 230. The final emulsion, subjected to chromatographic analysis, is free of residual solvents, is white in color, stable at a temperature between −25° C. and +60° C. The tests of dispersion in pure water or in the aqueous solutions of other suspending agents of cellulosic type, acrylic, polyvinyl alcohols confirm its perfect dispersibility and the absence of phenomena of deposit in the bottom and of sticky masses. For the successive tests of polymerization of the PVC-S to this emulsion the code PVA - AI is given.

The technology of alcoholysis utilized for obtaining the PVA-AI that employs a blend of methyl alcohol-water-sulphuric acid furnishes a distribution of the hydroxyl groups in the chain of the PVA called in literature "COMPLETELY RANDOM", and this is seen even from the publication: "Polyvinyl Alcohol Properties and Applications" edited by C. A. FINCH, Crode POLYMERS LIMITED London, Chapter 4, pag. 93.

Example No. 2

In the reactor are loaded in the order of: 160 Kg. of VAM;
35 Kg. of methyl alcohol;
5 Kg. of Benzoyl peroxide. The polymerization is continued for 7 hours at the reflux temperature to obtain a final conversion in polyvinylacetate up to 99%.

The K value or index of its molecular weight, is equal to 49. The mass is diluted with other 250 Kg. of methyl alcohol and is discharged leaving in the reactor 200 Kg. 0.26 Kg. of H2S04 g/mL (d.) 1.83 are added.

The product is brought to reflux and maintained for 8 hours.

40 Kg. of methanolic solution of polyvinylacetate K 25 of the same type utilized in the example 1 is loaded.

The azeotrope methyl-acetate-methylalcohol is extracted for 15 hours to a total extraction of 100 Kg. The process is stopped with 0.2 Kg. of NaOH dissolved in 50 L of water. As in the example 1 the methyl alcohol residue is stripped and the product is diluted with water to a % solids of 30.

As for the previous example, to this new emulsion is given the code PVA-A2, the same is seen to be constituted by 70 pp of PVA soluble in H20 with NS 230 and 30 pp of PVA insoluble in water with NS equal to 480. The technology of alcoholysis that employs anhydrous methyl alcohol and sulphuric acid has furnished a distribution of the groups OH classifiable in literature with the denomination "RANDOM".

Example No. 3

In the reactor are loaded in the order of:
200 Kg. of methanolic solution with 26% of PVAc K50 of the same type described in the example 2;
30 Kg. of solution of NaOH having the following composition: methyl alcohol 27 Kg., H20 2.5 Kg., NaOH 0.3 Kg.

The mass is maintained at the reflux temperature until observing a drop in temperature of 0.7° C. After that 50 Kg. of solution in methyl alcohol of PVAc K25 of the same type illustrated in the examples 1 and 2, are loaded. And the azeotrope methyl-acetate-methylalcohol is extracted for 8 hours to a total extraction of 100 Kg.

The process is stopped with 0.6 Kg. of acetic acid (titre 99%) bringing the pH to the value of 6.5. As for the examples 1 and 2, the process is continued with the distillation of the methyl alcohol and adding water to a final % of solids equal to 30%. The aspect and the establishment of the emulsion, code PVC-A3, is equal to that referred to in the preceding examples, its composition being the following: 65 p. p. of PVA with NS 230 and 10 mPa.s (cps)(4% in H20) and 35 p. p. of PVA with 480 NS emulsified under the form of microparticles with diameter between 0.01 μm and 10 μm. The technology of alcoholysis employed for producing the emulsion PVA-A3 has been of the type comprising methyl alcohol+sodium hydroxide+water and thus, as per literature, assume the denomination of "BLOCKY". This particular type of distribution of the hydroxyl groups easily verifiable by means of analysis with Nuclear Magnetic Resonance Spectroscopy (NMR), furnishes to the PVA distinct endowments of suspending agent and emulsifying agent and finds for this, particular use in reactors for producing PVC-suspension of large dimensions, (100–150 m$^3$) for which the problems of controlling the granulometric distribution of the finished PVC-S are well known.

Example No. 4

With this test the inventor wants to demonstrate the importance held by the technology of preparation and of pre-mixing, object of the present invention, of the polyvinyl alcohols of different NS, before the strippage of the solvents present in the same.

The perfect hot mixing of pseudo-solutions of methyl alcohol-water of polyvinyl alcohols of different NS, allows in fact the creation of the environment for the successive distillation of the methyl alcohol and the coagulation, in form of regular microparticles with diameter between 0.01μm and 10 μm of the polyvinyl alcohol totally insoluble in water.

For carrying out this demonstration the inventor decided to carry out two separate alcoholyses and then to unite the masses for the successive phases of strippage and dilution as claimed in the present invention.

First phase of the example 4

In the reactor the inventor loaded 200 Kg. of methanolic solution with the 50% of PVAc-K25 equal to that employed for the examples 1–2–3, after that the inventor stabilized the product at a temperature of 37° C. and in a time of 5400 s (60 minutes), loaded 30 Kg. of a solution of 5% sodiumomethylate in methyl alcohol. After a certain time the process is stopped with acetic acid to obtain a pH 6.5. IT is diluted with 30 Kg. of H20 demi.

The solution containing polyvinyl alcohol with 480 NS is stocked separately for the successive addition to the solution resulting from the second alcoholysis as described in the following.

Second phase of example 4

In the reactor 200 Kg. of methanolic solution with 50% of PVAc-K25 of the same type illustrated in the examples 2–3 are loaded. The temperature is increased to reflux and 1Kg. of H2S04 g/mL (d.)1.83 is further loaded. The reflux is continued until the temperature of the mass in ebullition drops by 2° C. The process is arrested with 0.8 Kg. of NaOH dissolved in 50 Kg of H20. The pH is controlled in order to be 6.5 and the NS of the polyvinylalcohol to be equal to 230. To the mass still hot and in agitation, is added the methanolic solution produced with the first alcoholysis and homogenization is provided for at least 5400 s (60 minutes). The process continues with the successive operations of strippage and dilution as foreseen for the examples 1–2–3. The aspect of the emulsion, code PVA-A4, and the analytical result of the same, confirm its identity with the emulsions produced with the tests 1–2–3. The polyvinyl alcohols present in the PVA-A4 came from two different technologies of alcoholysis and more exactly: RANDOM for the PVA soluble in water and BLOCKY for the PVA constituted of microparticles insoluble in water. Logically in the final emulsion the percentage of salts coming from the two separate hydrolyses, has a high % level of residual cinders, this % being 6 times greater than the % of the example No. 2 and more exactly between 0.05 and 0.33%. This increase of salts has a negative effect on the electrical properties of the PVC-S.

Example No. 5

The good results obtained in the quality of the PVC suspension by means of the use of aqueous emulsion of polyvinyl alcohols (PVA), object of the present invention, with blends of PVA with technology of mixed alcoholysis RANDOM-BLOCKY, have arrived at the following new example:

Into the reactor 200 Kg. of methanolic solution of PVAc-K50 like the examples 2–3–4 is loaded. The temperature is stabilized at 35° C. and in 4 hours, 10 Kg. of methanolic solution with 5% of sodium methylate is loaded. After this time, 200 Kg. of solution of PVAc-K25 like the examples 2–3–4 and 1.5 Kg. of H2S04 g/mL (d.)1.83 are further loaded.

The product is brought to reflux and for further 6 hours the azeotrope methyl acetate-methanol as already described with the preceding examples, is extracted.

The total distilled is 120 Kg.

The process is stopped with a solution of NaOH in water of pH 6.5.

The process is continued for the phases of solvents strippage and dilution as for the preceding examples 1–2–1–2–3–4. The aqueous emulsion defined with code PVA-A5 is similar to the preceding ones.

The fraction of PVA soluble in water with distribution of the hydroxyl groups type BLOCKY-RANDOM, and the fraction of polyvinyl alcohol insoluble in water with distribution type RANDOM.

In the enclosed table 1 all the summarised data of the examples 1–2–3–4–5 are reported.

From the examination of the table I summary of the test of alcoholysis, it can be noted that the aqueous emulsion of different types of polyvinyl alcohols having different NS, can be obtained:

- employing polyvinylacetate coming from polymerizations in aqueous emulsion, in aqueous suspension, in alcoholic solution and in block having thus different distributions of their molecular weights and with grade of polymerization as per the enclosed methods of analysis, indicated as K value variable from 10 to 110.
- applying all the techniques of alcoholysis as known and reported in literature with the denominations "RANDOM-BLOCKY" and with all their possible combinations.

The process, object of the present invention, is highly reproducible and industrially applicable in economical and ecological ways for production of new suspending agents suitable for solving many problems of the polymerization of the vinyl chloride in suspension.

Description of the examples of polymerization PVC-S reported in tables 2A and 2B.

The tests of polymerization of the vinyl chloride monomer with types of PVA-A1-A2-A3-A4-A5, have been carried out with autoclave of 500 L. with internal walls in stainless steel (AISI 316 LC), with agitator type "impeller" and with two break wave blades mounted on the walls of the reactor in opposite positions of 180°.

The autoclave was provided with an automatic loading system with closed manhole, with a spray device for the anti-crusting solution and with a valve for internal washing with H20 Demi to 1519.9 KPa absv (15 ATA). On the head of the reactor it was possible to insert a reflux condenser with a surface area of 2.5 m².

The polymerizations have been considered accomplished when the pressure of reaction drops by 354.6 K.Pa abs (3.5 bar) and for each load the final conversion has been measured by means of degassing and recovery of the unreacted VCM.

The suspension has been stripped by means of direct injection of steam 405.3 K.Pa abs (4 ATA) up to the temp. of 75° C. After the strippage, the suspension has been centrifuged and the PVC-S with 23% of H20, sent for drying on a fluidized bed.

After these treatments, equal for all the cited examples, the PVC-S has been analyzed as per the following methods of analysis:

Apparent density: as per DIN 53 - 468 - expressed in Kg/lt.

Plasticizing efficiency: as per DIN 53 - 417 expressed in %;

Granulometric distribution: as per DIN 53 - 734;

Resistivity of volume: as per ASTM D257 - 66;

Internal porosity of the average diameter of the pores expressed in I. tm; average volume of the pores expressed in cc/gr. Values sensed with mercury porosimeter of Carlo Erba series 200.

VCM residue after desiccation of the PVC-S, values expressed in ppm sensed with gas-chromatograph method.

Gelled particles - Fish-eyes:

The following method has been utilized:

For 300 s (5 minutes) are mixed: 160 g of PVC-S, 80 g of dioctyl phtalate, 0.8 g of cadmium stearate and 2.4 g of a premix made with PVC-S—carbon black and cadmium stearate. For calendering at 140° C. a film of the thickness of 0.0001 m (0.1 mm) is prepared and after 300 s (5 minutes) a square of 1 m (100 cm) is taken and in transparency it is possible to count in the product obtained, the unpigmented particles (Fish-eyes) present in the sample of film.

Thermic stability:

This test is carried out on the samples of previously plasticized PVC-S, stabilized and lubricated as per standard proceedings and in comparison with samples of PVC-S. From the mixture prepared after working for 600 s (10 minutes) in calenders at 140° C., samples of the thickness of 0.001m (1 mm), that are successively put in stoves at 165° C., are taken. After that the time expressed in minutes of variation of heat of the test in comparison with samples previously prepared is evaluated. The greater is the time expressed in minutes and more the PVC-S will have a good thermic stability to working.

Examples 6-7-8-9-10

With this first series of tests it is demonstrated that the types of PVA-A1-A2-A3-A4-A5, if employed in formulation without the support of other primary suspending agents or secondary suspending agents can produce all the types of industrially known PVC-S.

Thanks to the different compositions of the PVA-A1-A2-A3-A4-A5, it has been possibly to employ a constant quantitative of formulation for all the types of PVC-S with notable advantages, as well known to the skilled in art of the sector, in the successive phases of transformation and in the synergism with nontoxic stabilizing agents, etc.

In the test No. 6, a perfect compatibility of the PVA-A2 with the mercaptoethanol normally used as chain transferer for producing the PVC-S at low molecular weight has been observed. The inventor has verified that it is possible to utilize even other types of chain transferers Eg. trichloroethylene, dichloroethylene and, if necessary, a cross-linking type diallyl-maleate.

Example 11

The use of the PVA-A2 with tests that provided for the insertion of the reflux condenser in the autoclave of polymerization, allowed to establish that the quality of the finished PVC-S does not undergo harmful worsening with respect to the other tests without the condenser.

After 20 loads carried out with PVA-A2 the reflux condenser resulted perfectly clean thus confirming the antifoaming effect and anti-emulsioning effect that the PVA-A2 furnishes from the first moment of polymerization. The increase in productivity of the reactor has been about 20%.

Example 12

This test, carried out with initial load of H20 Demi at a temperature of 65°-70° C., tackles and solves one of the main problems of the loading of the autoclave and namely the possibility of reducing by at least 1800 s (30 minutes) the heating starting time with the external reactor liner.

This important technique of loading, not only allows for a notable reduction of the cycle of production, but also avoids the carrying out of prolonged overheating in the liner of the reactor to the detriment of the efficacy of the anti-crusting effect of the special agents applied with various techniques to the interior of the reactor before loading.

The advantage of obtaining a homogeneous and instantaneous dispersion of all the microparticles of PVA insoluble in water from the first instant of the reaction starting, demonstrates in this case the extreme industrial interest; in fact, it is possibly to achieve increments of production without sustaining the well known negative effects on the quality of the finished PVC-S.

Example 13

The previously analyzed tests 6 to 12 have been carried out with value of pH of polymerization starting equal to 7 by means of the use of 300 ppm of NaHCO3 as a buffer. The inventor revealed that it is further possible to control the value of the pH even with other types of buffer, as for example: ammonium hydroxide, sodium hydroxide, sodium carbonate, magnesium hydroxide, sodium phosphate.

The test 13 demonstrates that in absence of buffer, and with some ppm of residual air (02) at the starting of loading of the autoclave and hence with values of pH approximate to 3, the quality of the PVC-S is maintained at a high value.

The technique of the control of the residual vacuum in the reactor, finalized to control the granulometric distribution of the PVC-S, is perfectly applicable to formulations that employ the types of PVA which are the object of the present invention.

Example 14

With the test No. 14 in comparison with the test 6, the efficacy of the PVA type A2 in the case of loading of the same in two different moments of polymerization and exactly 1200 pp of initial load and 600 ppm in 1800 s (30 minutes) after the first hour of polymerization, is demonstrated.

The apparent density and the thermic stability of the PVC-S have had the foreseen improvement, the granulometric distribution is of optimum level as are all the other characteristics.

Examples 15 and 16

By means of the use of techniques of dispersion with homogenizing rollers and/or techniques that utilize the evaporation of the solvents (methyl-acetate, ethylacetate, etc.) with high values of vacuum (point of ebullition 6°–8° C.), the inventor prepared with PVA type A2 aqueous emulsions of the following catalysts

|  | % total solids | % catal. | % PVA-A2 | % water | % ethyl alcohol |
|---|---|---|---|---|---|
| a - lauryl peroxide | 30 | 15 | 15 | 70 | — |
| b - miristylpercarbonate | 30 | 15 | 15 | 70 | — |
| c - ethyl-esyl-percarbonate | 24 | 12 | 12 | 60 | 16 |
| d - culmyl-perneodecanoate | 24 | 12 | 12 | 60 | 16 |

With the so prepared catalyst emulsions for PVC-S, the inventor has carried out the tests of polymerization No. 15 and 16.

From the kinetic behavior of the polymerization and from the analytical results of the finished PVC-S, the inventor verified that the PVA is a product particularly suitable to produce aqueous emulsions of catalysts without the necessity of contemporary use of other types of suspending or emulsifying agents harmful for certain properties of tile PVC-S, as for example the resistivity of volume, the apparent density and the granulometric distribution.

The optimum stability of the aqueous emulsion of the catalysts type a-b-c-d and their efficacy in the final quality of the PVC-S is caused by the fact that the microparticles of catalyst, obtained with the previously described techniques, with diameter between 1 and 8 pm, is brought into contact with other stable microparticles of equal diameter of polyvinylalcohol insoluble in water and together they are emulsified in water thanks to the great fraction of polyvinyl alcohol soluble in water present in the PVA.

In the tests c and d the ethyl alcohol has the function of lowering the freezing point of the emulsions to around −20° C.

The presence of the ethyl alcohol in the aqueous emulsion is intrinsic to the process of preparation and distillation of the PVA, object of the present invention, in fact, even if all the examples cited in the preparation of the PVA-A1-A2-A3-A4-A5 have utilized methyl alcohol, it is possible, as the skilled man knows, to carry out all the hydrolyses in ethyl alcohol and at the end to leave residues of ethyl alcohol according to the necessity of the freezing points required of the emulsions themselves.

In all the cases the characteristics of the finished PVC-S have been of a high qualitative level. The pejorative phenomena already observed in the past by the skilled man and due principally to the poor dispersion of the catalyst particles from starting of the polymerization have not been revealed.

Examples 17-18-19-20-21-22-23

This last group of tests has been carried out for illustrating to experts of this field certain important applications of the product object of the present invention. The limited degree of examples reported should not however be considered as a limit to the multiplicity of possible applications.

By the examination of this group of tests the expert can verify that the PVA-A2 is perfectly compatible with all the technologies and with all the known suspending agents employed in the polymerization of the PVC-S.

The morphological characteristics of the finished PVC-S is confirmed in the levels of optimum quality, especially for the values of granulometric distribution, of thermic stability, of internal porosity and of VCM residue after the desiccation of the PVC-S.

During the tests it has been possible to disperse the PVA cold in the solutions of the various primary suspending agents and with them convey water to the automatic loading lines and to the reactor itself. The microparticles of PVA resulted stable and have not revealed phenomena of adhesion or coagulation on contact either with the solutions of suspending agent, or on contact with the water not completely warmed before the loading of the autoclave.

Example of cleaning of the autoclave

With the formulation described in the example No. II the inventor has carried out cycles of 20 polymerizations by means of, after each polymerization, application of different types of anti-crusting agents.

The result is that in all tile cases the optimum compatibility of the product object of the present invention with different anti-crusting products has been confirmed. After 20 polymerizations carried out with each type of anti-crusting agent, both the internal parts of the reactor and the reflux condenser resulted so perfectly clean and free from residues that the suspension of the test cycle was requested.

Advantageously for a good result of the process the inventor suggests the use of a catalyst that comprises sulphuric acid, and/or sodium methylate, and/or sodium hydroxide, respectively in the proportion parts by weight with respect to the PVAc present, between 0.05 and 8 for each of the elements mentioned and independently one from the other.

The alcohol utilized in the alcoholysis is methyl or ethyl alcohol in the proportion in parts by weight with respect to the PVAc present, between 0.2 and 20 times, preferably 3 times.

Preferably from the industrial necessity and looking at the costs, the alcohol utilized in the alcoholysis is methyl alcohol in the proportion in parts by weight with respect to the PVAc present, comprised between 0.2 and 20, preferably 3.

Obviously the methyl alcohol in the same proportions can be advantageously substituted in all or in part with ethyl alcohol for toxic aspects or alternative use.

TABLE No. 1

| ABSTRACT OF THE EXAMPLES 1-2-3-4-5 | | | | | |
|---|---|---|---|---|---|
| Example No. | 1 | 2 | 3 | 4 | 5 |
| a - code of the product PVA | A1 | A2 | A3 | A4 | A5 |
| b - % active substance | 30 | 30 | 30 | 30 | 30 |
| c - % PVA soluble in water present in the active solution | 70 | 70 | 65 | 46 | 46 |
| d - saponification number of the fraction reported in (c) | 230 | 230 | 230 | 230 | 230 |
| e - % PVAC insoluble in water present in the active substance under the form of microparticles | 30 | 30 | 35 | 54 | 54 |
| f - degree of saponification of the fraction reported in (e) | 480 | 480 | 480 | 480 | 480 |
| g - viscosity at 20° C. in m Pa.s (cps) of the aqueous solution with 4% of the fraction indicated in (c) and (d) | 45 | 8 | 8 | 8 | 8 |
| g - K value of the PVAc utilized for producing the fraction indicated in (e) and (d) | 102 | 49 | 49 | 49 | 49 |
| i - K value of the PVAc utilized for producing the fraction indicated in (e) and (d) | 25 | 25 | 25 | 25 | 25 |
| l - type of alcoholisis as the definition reported in literature | COMPLETELY RANDOM | RANDOM | BLOCKY | RANDOM-BLOCKY | |

TABLE 2A

| Example No. | | 6 | 7 | 8 | 9 | 10 | 11 | 12 | 13 | 14 |
|---|---|---|---|---|---|---|---|---|---|---|
| type of PVC - S | K Value | 57 | 67 | 70 | 70 | 70 | 70 | 70 | 70 | 57 |
| reactor with reflux condenser | | NO | NO | NO | NO | NO | SI | NO | NO | NO |
| TEMPERATURE of polymerization | °C. | 64 | 57 | 54 | 54 | 54 | 54 | 54 | 54 | 64 |
| TEMPERATURE of load H₂O DEMI | °C. | 30 | 30 | 30 | 30 | 30 | 30 | 65 | 30 | 30 |
| H₂O DEMI | p.p. | 150 | 130 | 120 | 120 | 120 | 120 | 120 | 120 | 120 |
| vinylchloride monomer (VCM) | p.p. | 100 | 100 | 100 | 100 | 100 | 100 | 100 | 100 | 100 |
| NaHCO₃ - buffer | p.p. | 300 | 300 | 300 | 300 | 300 | 300 | 300 | 0 | 300 |
| PVA - A1 | p.p. | — | 1800 | — | — | — | — | — | — | — |
| PVA - A2 | p.p. | 1800 | — | 1800 | — | — | 1800 | 1800 | 1800 | 1200 |
| PVA - A3 | p.p. | — | — | — | — | — | — | — | — | — |
| PVA - A4 | p.p. | — | — | — | 1800 | — | — | — | — | — |
| PVA - A5 | p.p. | — | — | — | — | 1800 | — | — | — | — |
| PVA - A3 second load after 1 hour | p.p. | — | — | — | — | — | — | — | — | — |
| first empty of the VMC load | KPa | MAX | MAX | MAX | MAX | MAX | MAX | MAX | 66.6 | 666 |
| initial pH of polymerization | ph | 7 | 7 | 7 | 7 | 7 | 7 | 7 | 3.1 | MAX 7 |
| UNCHANGED LAUROYL-PEROXIDE | p.p. | 700 | 300 | 100 | 100 | 100 | 100 | 100 | 100 | 700 |
| LAUROYL-PEROXIDE in aqueous emulsion with PVA - A2 | p.p. | — | — | — | — | — | — | — | — | — |
| UNCHANGED MIRISTYL-PERCARBONATE | p.p. | 200 | 400 | 500 | 500 | 500 | 500 | 500 | 500 | 200 |
| MIRISTYL-PERCARBONATE in aqueous emulsion with PVA - A2 | p.p. | — | — | — | — | — | — | — | — | — |
| 2-ETHYLESYL PERCARBONATE + CUMYL-PERNEODECANOATE in emulsion water - ethanol with PVA - A2 | p.p. | — | — | — | — | — | — | — | — | — |
| HYDROXY-PROPYL-METHYL CELLULOSE or METHYL-CELLULOSE | p.p. | — | — | — | — | — | — | — | — | — |
| HYDROXY-ETHYL-CELLULOSE or HYDROXY-PROPYL-CELLULOSE | p.p. | — | — | — | — | — | — | — | — | — |
| PVA 137 NS and 43 m Pa.s (cps) | p.p. | — | — | — | — | — | — | — | — | — |
| PVA 230 NS and 37 m Pa.s (cps) | p.p. | — | — | — | — | — | — | — | — | — |
| PVA 290 NS and 5 m Pa.s (cps) | p.p. | — | — | — | — | — | — | — | — | — |
| SORBITOL MONOLAURATE or SORBITOL MONOSTEREATE | p.p. | 200 | — | — | — | — | — | — | — | — |
| MERCAPTO-ETHANOL | p.p. | — | — | — | — | — | — | — | — | — |
| time of reaction | hours | 5³⁰ | 6 | 6 | 6 | 6 | 4³⁰ | 6 | 6 | 5⁴⁰ |
| final conversion | % | 88 | 91 | 92 | 92 | 92 | 92 | 92 | 92 | 88 |
| VCM residue after stripping | ppm | 28 | 23 | 18 | 20 | 20 | 20 | 20 | 22 | 25 |
| Apparent density | g/mL | 0.535 | 0.515 | 0.500 | 0.505 | 0.505 | 0.505 | 0.500 | 0.480 | 0.5 |
| Internal porosity - volume of the respective pores | cm³/g | 0.23 | 0.33 | 0.39 | 0.35 | 0.36 | 0.37 | 0.39 | 0.40 | 0.2 |
| Internal porosity - average diameter of the pores | μm | 0.45 | 0.67 | 0.95 | 0.70 | 0.75 | 0.70 | 0.90 | 0.90 | 0.4 |
| Absoption of the plastificant | % | 26 | 35 | 40 | 36 | 37 | 36 | 36 | 38 | 25 |
| Gels or Fish - eyes | No. | <5 | <5 | <5 | <5 | <5 | <5 | <5 | <5 | <5 |
| Resistivity of the volume | 10⁻¹³Ωm | — | 0.1 | 0.1 | 0.06 | 0.07 | 0.098 | 0.097 | 0.098 | — |
| Thermal stability | s | 7200 | 7200 | 6900 | 6000 | 6300 | 6600 | 6900 | 5700 | 7200 |
| Residual VCM after dessication | ppm | 1 | 1 | <1 | <1 | <1 | <1 | <1 | <1 | <1 |
| GRANULOMETRIC DISTRIBUTION | RESIDUAL PVC-S on 60 μm (microns) | 0 | 0 | 0 | 0 | 0 | 0 | 0 | 0 | 0 |
| | RESIDUAL PVC-S on 80 μm (microns) | 1 | 2 | 1 | 2 | 3 | 1 | 4 | 3 | 2 |
| | RESIDUAL PVC-S on 100 μm (microns) | 10 | 10 | 5 | 18 | 22 | 8 | 6 | 11 | 13 |
| | RESIDUAL PVC-S on 140 μm (microns) | 68 | 75 | 65 | 65 | 62 | 77 | 75 | 73 | 62 |
| | RESIDUAL PVC-S on 200 μm (microns) | 18 | 12 | 29 | 12 | 10 | 13 | 14 | 12 | 20 |
| | RESIDUAL PVC-S on BOTTOM | 3 | 1 | 5 | 3 | 3 | 1 | 1 | 1 | 3 |

TABLE 2B

| Example No. | | 15 | 16 | 17 | 18 | 19 | 20 | 21 | 22 | 23 |
|---|---|---|---|---|---|---|---|---|---|---|
| type of PVC - S | K Value | 70 | 70 | 70 | 70 | 70 | 70 | 70 | 70 | 70 |
| reactor with reflux condenser | | NO | NO | NO | NO | NO | NO | NO | NO | NO |
| temperature of polymerization | °C. | 54 | 54 | 54 | 54 | 54 | 54 | 54 | 54 | 54 |
| temperature of load H$_2$O DEMI | °C. | 30 | 30 | 30 | 30 | 30 | 30 | 30 | 30 | 30 |
| H$_2$O DEMI | p.p. | 120 | 120 | 120 | 120 | 120 | 120 | 120 | 120 | 120 |
| vinylchloride monomer (VCM) | p.p. | 100 | 100 | 100 | 100 | 100 | 100 | 100 | 100 | 100 |
| NaHCO$_3$ - buffer | p.p. | 300 | 300 | 300 | 300 | 300 | 300 | 300 | 300 | 300 |
| PVA - A1 | p.p. | — | — | — | — | — | — | — | — | — |
| PVA - A2 | p.p. | 1200 | 1300 | 1200 | 1200 | 1200 | 1000 | 1300 | 1200 | 1200 |
| PVA - A3 | p.p. | — | — | — | — | — | — | — | — | — |
| PVA - A4 | p.p. | — | — | — | — | — | — | — | — | — |
| PVA - A5 | p.p. | — | — | — | — | — | — | — | — | — |
| PVA - E66-A3 second after 1 hour | p.p. | — | — | — | — | — | — | — | — | — |
| empty first of the VCM | KPa | MAX | MAX | MAX | MPX | MAX | MAX | MAX | MAX | MAX |
| pH initial of polymerization | pH | 7 | 7 | 7 | 7 | 7 | 7 | 7 | 7 | 7 |
| Unchanged LAURYL-PEROXIDE | p.p. | 100 | 100 | 100 | 100 | 100 | 100 | 100 | 100 | 100 |
| LAURYL-PEROXIDE IN aqueous emulsion with PVA - A2 | p.p. | (100)* 200 | (200)* 400 | — | — | — | — | — | — | — |
| Unchanged MIRISTYL-PERCARBONATE | p.p. | (500)* 1000 | — | 500 | 500 | 500 | 500 | 500 | 500 | 500 |
| MIRISTYL-PERCARBONATE in emulsion with PVA - A2 | p.p. | — | (330)* 700 | — | — | — | — | — | — | — |
| 2-ETHYL-EXYL-PERCARBONATE + CUMYL-PERNEODECANOATE in emulsion water-ethanol with PVA - A2 | p.p. | — | — | — | — | — | — | — | — | — |
| HYDROXY-PROPYL-METHYL CELLULOSE or methyl - cellulose | p.p. | — | — | 0.03 | 0.03 | 0.03 | 0.04 | — | — | — |
| HYDROXY-ETHYL-CELLULOSE or HYDROXY-PROPYL-CELLULOSE | p.p. | — | — | — | — | — | 0.06 | 0.05 | 0.04 | — |
| PVA 137 NS and 43 m Pa.s (cps) | p.p. | — | — | — | — | — | — | — | — | — |
| PVA 230 NS and 37 m Pa.s (cps) | p.p. | — | — | — | 0.03 | — | — | — | — | — |
| PVA 290 NS and 5 m Pa.s (cps) | p.p. | — | — | — | — | — | — | — | — | — |
| SORBITOL MONOLAURATE or SORBITOL MONOSTEREATE | p.p. | — | — | — | — | 0.05 | — | — | — | 0.06 |
| MERCAPTO-ETHANOL | p.p. | — | — | — | — | — | — | — | 0.03 | — |
| time of reaction | hours | 6 | 5 | 6 | 6 | 6 | 6 | 6 | 6 | 6 |
| final conversion | % | 92 | 92 | 92 | 92 | 92 | 92 | 92 | 92 | 92 |
| residual VCM after stripping | ppm | 23 | 23 | 23 | 25 | 25 | 25 | 23 | 23 | 25 |
| APPARENT DENSITY | g/mL | 0.500 | 0.500 | 0.502 | 0.498 | 0.500 | 0.538 | 0.500 | 0.500 | 0.500 |
| INTERNAL POROSITY - VOLUME OF PORES | cm$^3$/g | 0.38 | 0.37 | 0.37 | 0.37 | 0.33 | 0.28 | 0.36 | 0.37 | 0.37 |
| INTERNAL POROSITY - | μm | 0.85 | 0.85 | 0.85 | 0.90 | 0.70 | 0.42 | 0.80 | 0.90 | 0.90 |
| AVERAGE DIAMETER OF PORES | (micron) | | | | | | | | | |
| PLASTICIZING ABSORBTION | % | 36 | 38 | 38 | 35 | 32 | 31 | 36 | 36 | 36 |
| FREEZES OR FISH - EYES | No. | <5 | <5 | <5 | <5 | <10 | <25 | <5 | <5 | <5 |
| VOLUME RESISTIVITY | 10$^{-13}$ Ωm | 0.1 | 0.1 | 0.099 | 0.09 | 0.06 | 0.08 | 0.085 | 0.092 | 0.07 |
| THERMIC STABILITY | s | 6900 | 6900 | 7080 | 6900 | 7200 | 6120 | 6900 | 6900 | 6900 |
| VCM RESIDUE AFTER DRYING | ppm | <1 | <1 | <1 | <1 | <1 | <1 | <1 | <1 | <1 |
| GRANULOMETRIC DISTRIBUTION | RESIDUAL PVC-S on 60 μm (microns) % | 0 | 0 | 0 | 0 | 0 | 0 | 0 | 0 | 0 |
| | RESIDUAL PVC-S on 80 μm (microns) % | 3 | 4 | 0 | 4 | 3 | 4 | 4 | 4 | 4 |
| | RESIDUAL PVC-S on 100 μm (microns) % | 21 | 18 | 16 | 19 | 23 | 25 | 11 | 11 | 23 |
| | RESIDUAL PVC-S on 140 μm (microns) % | 78 | 68 | 70 | 67 | 69 | 49 | 71 | 81 | 72 |
| | RESIDUAL PVC-S on 200 μm (microns) % | 7 | 8 | 11 | 9 | 4 | 18 | 13 | 3 | 3 |
| | RESIDUAL PVC-S on BOTTOM % | 1 | 2 | 3 | 1 | 1 | 4 | 1 | 1 | 1 |

*the values within (*) indicate the p.p. of effective catalyst

I claim:

1. A process for the preparation of an aqueous emulsion of two or more polyvinyl alcohols (PVA) with different saponification numbers (NS) for use in the production of polyvinylchloride (PVC-S) in an aqueous suspension comprising the steps of:
   i) utilizing at least a first polyvinylacetate (PVAc) with molecular weight between 30 and 110K, to carry out the alcoholysis of the PVAc to reach NS values between 598 and 135 in the presence of ethyl alcohol or methyl alcohol with acidic or basic-catalyst;
   ii) loading from 0.1 to 5 times parts by weight with respect to the first PVAc, of a second PVAc having a molecular weight between 10 and 90K;
   iii) stopping the alcoholysis such that, in a final alcoholic solution, the respective PVA are perfectly mixed in order to obtain;
   a) at least a first PVA, with NS between 280 and 95, soluble in water;
   b) at least a second PVA, with NS between 598 and 312, insoluble in water;
   iv) and distilling during the alcoholysis or at its termination, the residual solvents by adding water after the alcoholysis so as to obtain coagulation in water of the second PVA in the form of microparticles with a granulometric distribution between 0.1 um and 10 um.

2. A process as claimed in claim 1, wherein the catalyst is sulphuric acid, and/or sodium methylate, and/or sodium hydroxide, respectively in the proportionate parts by weight with respect to the PVAc present, between 0.05 and 8 for each of said catalysts and independently one from the other.

3. A process as claimed in claim 1, wherein the alcohol utilized in the alcoholysis is methyl alcohol in the proportionate pans by weight with respect to the PVAc present, between 0.2 and 20 times.

4. A process as claimed in claim 1, wherein the alcohol utilized in the alcoholysis is ethyl alcohol in the proportionate parts by weight with respect to the PVAs present between 0.2 and 20 times.

* * * * *